United States Patent [19]

Link et al.

[11] Patent Number: 5,153,771
[45] Date of Patent: Oct. 6, 1992

[54] COHERENT LIGHT MODULATION AND DETECTOR

[75] Inventors: Charles A. Link; Paul D. Lang, both of Palatine, Ill.

[73] Assignee: Northrop Corporation, Los Angeles, Calif.

[21] Appl. No.: 556,789

[22] Filed: Jul. 18, 1990

[51] Int. Cl.$^5$ .......................... G02F 1/11; G02B 26/00; G02B 27/00; H01S 3/117
[52] U.S. Cl. .................................. 359/286; 359/290; 359/579; 372/13
[58] Field of Search ................ 350/358; 356/352; 359/286, 290, 323, 578, 579; 372/10, 13

[56] References Cited

U.S. PATENT DOCUMENTS

| 3,330,956 | 7/1967 | Wade | 359/286 |
| 3,546,620 | 12/1970 | Erickson et al. | 359/579 |
| 3,622,790 | 11/1971 | Zavodny | 359/579 |
| 3,672,746 | 6/1972 | Miller | 359/290 |
| 3,802,775 | 4/1974 | Hughes | 359/579 |
| 3,874,782 | 4/1975 | Schmidt | |
| 3,877,781 | 4/1975 | Kaminow | |
| 3,923,373 | 12/1975 | Dabby et al. | |
| 4,184,738 | 1/1980 | Wright | |
| 4,269,481 | 5/1981 | Yeh et al. | |
| 4,396,246 | 8/1983 | Holman | |
| 4,553,816 | 11/1985 | Durand et al. | 359/578 |
| 4,743,114 | 5/1988 | Crane, Jr. | 356/352 |
| 4,793,675 | 12/1988 | Handa | |
| 4,793,676 | 12/1988 | Risk | |

FOREIGN PATENT DOCUMENTS 0620054 3/1949 United Kingdom ................ 359/579

OTHER PUBLICATIONS

Cohen et al.; "Acoustic Scattering of Light in a Fabry-Perot Resonator"; The Bell Systems Technical Journal, vol. 45, No. 6 (Jul.-Aug. 1966), p. 945+.
Suzuki et al.; "The Coherent Interaction of Externally Generated 35 GHz Sound with the Light in CdS"; Appl. Phys. Lett., vol. 30, No. 7 (Apr. 1, 1977), p. 310+.
"Multiple-Cavity Infrared Electro-Optic Tunable Filter", SPIE vol. 202, Active Optical Devices (1979), p. 21.
"Double-Cavity Electrooptic Fabry Perot Filter", Applied Optics, Sep. 1, 1982, vol. 21, No. 17.

Primary Examiner—Eugene R. LaRoche
Assistant Examiner—Evelyn A. Lester
Attorney, Agent, or Firm—Terry J. Anderson; Robert B. Block

[57] ABSTRACT

A acousto-optic Fabry-Perot optical modulator (10) has a crystalline body (12) having a first partially reflective electrode (14) for receiving radiation, including laser radiation having a wavelength or wavelengths of interest, and a second, oppositely disposed partially reflective electrode (14) for emitting the received radiation including the laser radiation. The modulator is driven by an alternating source (16) at a resonant frequency of the crystalline body and intensity modulates at the resonant frequency only the emitted laser radiation. A detector (18) is positioned for receiving the emitted radiation, including the intensity modulated laser radiation, and has an output signal expressive of the intensity of the emitted radiation. Signal processing circuitry (20,34) is coupled to the detector output signal and is responsive thereto for identifying the intensity modulated laser radiation for indicating when laser radiation is received by the modulator.

15 Claims, 2 Drawing Sheets

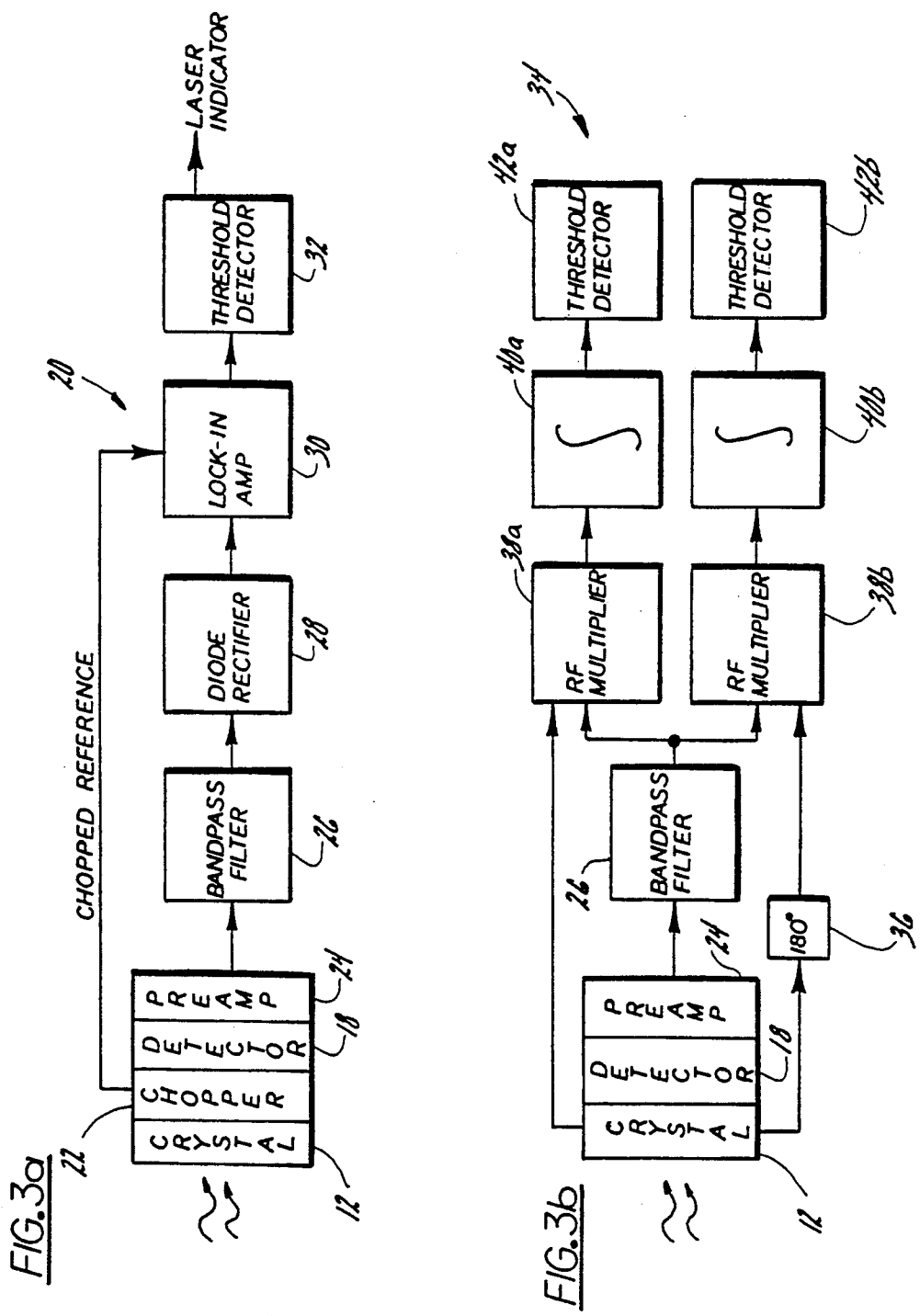

COHERENT LIGHT MODULATION AND DETECTOR

FIELD OF THE INVENTION

This invention relates generally to optical modulators and, in particular, to a Fabry-Perot optical modulator that operates in accordance with an acousto-optic, as opposed to an electro-optic, principle.

BACKGROUND OF THE INVENTION

The Fabry-Perot is known type of optical filter or interferometer structure that relies on an interference of multiple reflected beams. Incident light undergoes multiple reflections between two oppositely opposed coated surfaces which define therebetween an optical cavity. Each transmitted wavefront experiences an even number of reflections. When there is no phase difference between these wavefronts interference between them produces a transmission maximum. This occurs when the optical path difference is an integral number of whole wavelengths. At other wavelengths, destructive interference of the transmitted wavefronts reduces the transmitted intensity towards zero.

The transmission peaks can be made very sharp by increasing the reflectivity of the mirror surfaces. The ratio of the full width at half maximum (FWHM) of a transmission peak to the separation of successive peaks is termed the finesse. High reflectance results in a high finesse.

In an article entitled "Double-Cavity Electrooptic Fabry Perot Tunable Filter", Applied Optics, Sep. 1, 1982, Vol. 21, No. 17 William Gunning describes a development of an infrared multiple cavity electro-optically tuned Fabry-Perot fiber using $LiNbO_3$. This filter, designed for operation in the 3–5 micron spectral band, was demonstrated by angle scanning using a He-Ne laser at 3.39 microns. A multiple-cavity configuration increased a free-spectral range of a 2-Angstrom bandwidth filter from 67 Angstroms to 670 Angstroms.

One significant application for a Fabry-Perot filter is in the construction of a Laser Receiver (LR). Traditional LR technology utilizes temporal-coherence discrimination to detect laser threats. This is accomplished with various types of etalons and detectors. As used herein an etalon includes two parallel, semi-reflecting surfaces, separated a finite distance apart. The space between the surfaces of an etalon can be filled by any optically transmitting material. The surfaces of the etalon are parallel and flat to at least (wavelength/20). Laser light incident on an etalon either interferes constructively or destructively. A laser detection is generated when there is a difference of signal levels from one etalon step size to another. Broad-band spectral sources transmit equally through all etalons and therefore are discriminated from laser radiation. This configuration may be employed for short-pulse lasers but is not sufficient to detect long-pulse or cw lasers.

Temporal coherence discrimination can also be achieved by using a single etalon in which the Optical Path Length (OPL) is modulated rapidly over the period of the pulse.

In this case, laser light generates a sinusoidal signal at the frequency of modulation. However, broadband light does not generate a sinusoidal signal since the average transmission of the etalon for broadband light remains substantially constant.

OPL modulation has previously been accomplished by mounting etalon plates between piezoelectric stacks. The OPL is varied by changing the distance between the etalon plates. However, these systems are sensitive to thermal vibrations and modulate at a relatively slow rate. Since the modulation rate is directly proportional to an ability to detect shorter pulses a lower limit is placed on the pulse width that can be discriminated or on the time required to declare a laser threat.

A second OPL modulation approach has employed the electro-optic effect. In this case the OPL is varied by varying the index of refraction of an electro-optic material. An etalon of electro-optic material is coated with dielectric coatings and a large voltage potential is applied to change the index of refraction via the electro-optic effect. The change in the index of refraction for light propagating along an optic axis of the material is given by the expression $$n = -\tfrac{1}{2} n_o^3 \, r_{13} E_3,$$

where $n_o$ is the refractive index, $r_{13}$ is the electro-optic coefficient, and $E_3$ is the applied field. Modulation of one half of a free spectral range (FSR) is required for maximum sensitivity. By example, to modulate half a FSR at a wavelength of 0.6328 microns requires a high voltage of approximately ±2 kV. This required high voltage necessitates using dielectric electrodes which are difficult to modulate at high frequencies. This type of device was constructed for use in a static mode as described by W. Gunning and P. Yeh, "Multiple-Cavity Infrared Electro-Optic Tunable Filter", SPIE Vol. 202, Active Optical Devices (1979), pg. 21. See also U.S. Pat. No. 4,269,481, May 26, 1981, "Multiple-Cavity Electro-Optic Tunable Filter" by P. A. Yeh and J. M. Tracy.

Other prior art of interest includes the following. In U.S. Pat. No. 4,793,675, Dec. 27, 1988 Y. Handa discloses a $LiNbO_3$ optical waveguide said to employ a surface acoustic wave. In U.S. Pat. No. 4,184,738, Jan. 22, 1980, S. Wright discloses an optical waveguide having interdigitated or triangular electrodes and operating by Dec. 27, 1988, Risk discloses a fiber optic amplitude modulator employing surface acoustic waves that impact on the fiber. In U.S. Pat. No. 3,932,373, Dec. 2, 1975, Dabby et al. and in U.S. Pat. No. 4,396,246, Aug. 2, 1983 Holman discloses $LiNbO_3$ waveguide modulators. In U.S. Pat. No. 3,874,782, Apr. 1, 1975 Schmidt discloses an $LiNbO_3$ strip waveguide modulator having electrodes 16 on opposite sides of the crystal. And, in U.S. Pat. No. 3,877,781, Apr. 15, 1975 Kaminow discloses an $LiNbO_3$ optical waveguide that employs three electrodes to modulate light passing therethrough.

However, none of this prior art discloses, and it is thus an object of the invention to provide, a Fabry Perot optical device that operates in accordance with an acousto-optic principle to modulate a light beam passing therethrough.

It is a further object of the invention to provide a Laser Receiver that includes an acousto-optic Fabry Perot optical device to detect the presence of a laser beam and which distinguishes a single line or multiple line laser source from a broadband source.

SUMMARY OF THE INVENTION

The foregoing problems are overcome and the objects of the invention are realized by apparatus for detecting the presence of single line or multi-line coherent radiation within a field of view. A laser radiation detector of the invention includes an acousto-optic Fabry-Perot optical modulator. The modulator is a crystalline body with parallel, partially reflective surfaces. A substantial portion of laser energy incident on the first surface is either transmitted through the second surface or reflected back, depending on the instantaneous distance between the plates. The modulator is driven by an alternating source at a resonant frequency of the crystalline body and intensity modulates, at the resonant frequency, only the emitted laser radiation. A detector is positioned for receiving the emitted radiation, including the intensity modulated laser radiation, and has an output signal expressive of the intensity of the emitted radiation. Signal processing circuitry is coupled to the detector output signal and is responsive thereto for identifying the intensity modulated laser radiation for indicating when laser radiation is received by the modulator.

The body may be comprised of z-cut $LiNbO_3$ having a thickness within a range of approximately 0.2 mm to approximately 3 mm. By example, the body has a thickness of approximately one millimeter and exhibits resonant frequencies of 3.75 MHz, 11.5 MHz and 49.8 MHz. The excitation signal preferably has an amplitude of less than ±200 volts, an approximately 10 times reduction over the electro-optic type Fabry-Perot modulators of the prior art.

BRIEF DESCRIPTION OF THE DRAWING

The above set forth and other features of the invention are made more apparent in the ensuing Detailed Description of the Invention when read in conjunction with the attached Drawing, wherein:

FIGS. 3a and 3b illustrate two detection techniques for achieving noise rejection, specifically, FIG. 3a illustrates detection using lock-in amplification in conjunction with a chopped reference signal and FIG. 3b illustrates detection using crystal phase information.

DETAILED DESCRIPTION OF A PREFERRED EMBODIMENT OF THE INVENTION

Figure 1A:
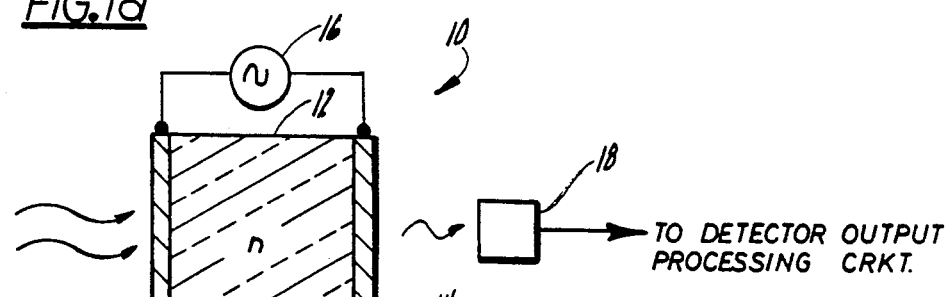
FIG. 1a is a cross-sectional view, not to scale, of an acousto-optic Fabry-Perot optical modulator having a sinusoidal excitation source connected to electrodes and being positioned relative to a detector that detects radiation transmitted through the modulator.

Referring to FIG. 1a there is shown a cross-sectional view, not to scale, of an acousto-optic Fabry-Perot optical modulator 10 constructed and operated in accordance with the invention. The Acousto-Optic Fabry-Perot modulator 10 is an acoustic device for modulating coherent light sources over a large incident field of view.

Modulator 10 includes in a presently preferred embodiment a relatively thin disc-shaped cylindrical body 12 having a thickness of approximately 1 mm. Body 12 is comprised of an acoustic material such as z-cut $LiNbO_3$. $LiNbO_3$ is an excellent material for constructing the modulator 10 because of its large acoustic coefficients. Other satisfactory materials include y-cut quartz and z-cut $LiTaO_3$. Opposing faces of the cylinder are polished very flat and parallel. The faces are coated with a semitransparent metallic coating, such as gold, to create electrodes 14. The coatings must have a low electrical resistance to enable a modulating voltage to be applied across the crystal at high frequencies. The coating reflectance may adjusted to achieve different depths of modulation.

The electrodes 14 are coupled to a circuit 16 that resonates at a characteristic acoustic resonant frequency of the crystalline body 12.

Light transmitted through the modulator 10 is detected by a detector 18 which in turn produces a signal that is applied to detector output processing circuitry.

Figure 1B:
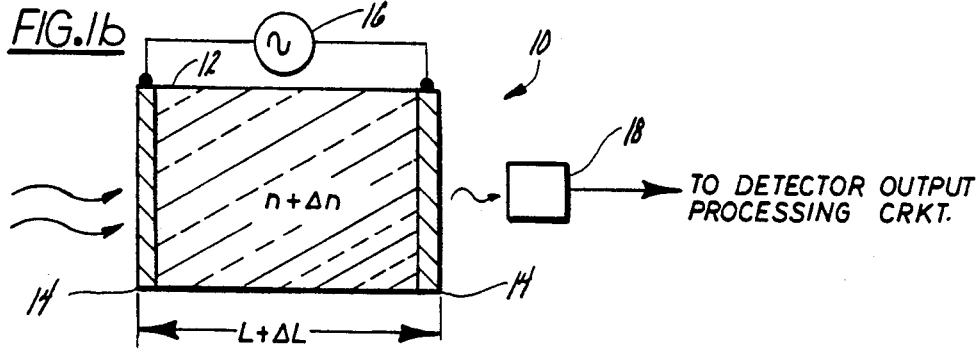
FIG. 1b illustrates the modulator of FIG. 1a and shows an increase in optical path length caused by a change in the crystal width (delta L) and change in the index of refraction (delta n) of the modulator material.

FIG. 1b illustrates the modulator 10 of FIG. 1a and illustrates an increase in optical path length caused by a change in the crystal width (delta L), and a change in the index of refraction (delta n). That is, as the crystalline body 12 oscillates the optical path length through the crystal also oscillates. As the optical path length oscillates coherent light is modulated as it interferes constructively or destructively.

Figure 2A:
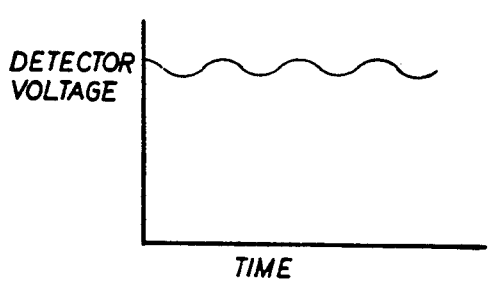
FIG. 2a is a graph that illustrates the effect of the optical path length change in modulating laser light.
Figure 2B:
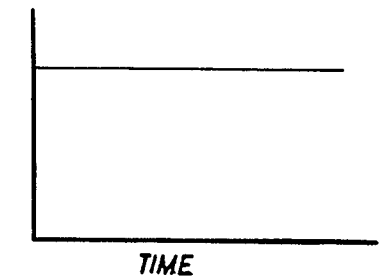
FIG. 2b illustrates that the optical path length change has an insignificant change on non-laser light.

FIG. 2a is a graph that illustrates the effect of the optical path length change in modulating coherent light while FIG. 2b illustrates that the optical path length change has an insignificant impact on broadband non-laser light. The modulator 10 is operable for modulating broad beams of coherent light over a large field of view and also for modulating several beams simultaneously. The modulator 10 modulates effectively over substantially the entire spectral transmission band of the acoustic material that comprises the crystalline body 12.

The depth of modulation is a function of the coating reflectance, modulation voltage and the wavelength of the incident light. For certain wavelengths and for a high modulating voltage a depth of modulation of over 60% is achievable. The coherence length required to achieve a high modulation efficiency is directly related to the thickness of the crystalline body 12. The coherence length ($L_c$) of detectable laser radiation is given approximately by the product of (4nd) where d is the thickness and where n is the index of refraction. By example, for a one millimeter thick $LiNbO_3$ crystalline body with n=2.2 the required coherence length is 8.8 mm. For radiation having shorter coherence lengths the depth of modulation is reduced.

In accordance with an aspect of the invention the modulation of the light is synchronized with the voltage impressed across the crystalline body 12. Therefore, various lock-in detection schemes can be employed.

FIG. 3 illustrates two detection techniques that achieve noise rejection. Specifically, FIG. 3a illustrates a circuit 20 that achieves detection using lock-in amplification in conjunction with a chopped reference signal. Light transmitted through the crystalline body 12 of the modulator 10 is chopped by a chopper 22 before being received by the detector 18. A preamplifier 24 amplifies the detector 18 output signal and applies the signal to a bandpass filter 26 having a passband centered at the resonant frequency of the crystalline body 12. The output of the filter 26 is rectified by a diode rectifier 28 and applied to a lock-in amplifier 30. The lock-in amplifier multiplies the input signal with the chopper reference signal, and integrates this product for a period of time. The output of the lock-in amplifier 30 is applied to a threshold detector 32 for detecting the presence an electrical signal resulting from laser light.

FIG. 3b illustrates a circuit 34 that achieves detection using crystal phase information. In FIG. 3b two RF channels are fed by the bandpass filter 26. Each RF channel includes an RF multiplier 38, an integrator 40 and a threshold detector 42a. RF multiplier 38a receives a crystal reference signal while RF multiplier 38b received a crystal reference signal that is shifted 180° by a phase shifter 36. The modulated laser signal is either in phase or 180° out of phase with the crystal driving voltage 16. The multiplier is similar to that of the lock-in amplifier, multiplying the input by the crystal reference signal and integrating the output of the multiplier over time. A threshold circuit detects when the output of the integrator exceeds the threshold.

As can be realized the acousto-optic Fabry-Perot modulator is an effective laser modulator which has many advantages over traditional modulators, including a lower cost. The modulator 10 can be employed inside of a laser cavity as an internal modulator. It can also be used to simulate heterodyne signals.

Describing now the operation of the modulator 10 in greater detail the OPL of the body 12, or etalon, is changed by stretching or compressing the crystal. The change in OPL is proportional to $$\Delta OPL\ \alpha(\gamma_{13}n_0^3\ S_3 + n_o\ S_3)L$$

where $\gamma_{13}$ photoelastic tensor component, $S_3$ is the strain component, and L is the width of the crystal. This is similar in some respects to a conventional electro-optic Fabry-Perot device. One significant difference is that the semiconductor coatings of the conventional device are replaced by metallic coatings and the crystal is oscillated at resonance. A voltage of less than ±200 V produces a change in optical path length of a free spectral range; as compared to ±2 KV in the prior art device described above. In addition, a characteristic crystal resonance frequency in the megahertz region permits short pulse detection.

Gold electrode 14 coatings are preferred because of their low electrical resistance. However, gold was found not to adhere well to the surface of the crystalline body 12. This problem was overcome by first applying a binding layer comprised of, by example, chrome or a dielectric material to the crystal faces and subsequently applying the gold coating over the binding layer. Chrome has a superior adhesion quality, relative to gold, to the crystalline body 12. Silver electrodes are also acceptable. A binding layer must also be used for silver coatings. Conductive dielectric coatings are also acceptable, such as InTiO, however these coatings typically exhibit a lower electrical conductance.

A measurement of crystal impedance revealed three resonant points at 3.76 MHz, 11.5 MHz, and 49.8 MHz. Strong modulation of a laser beam was observed at the fundamental resonance 3.75 MHz and at 11.5 MHz.

Laser modulation as a function of driving voltage was measured. It was found that below 200 volts, specifically at 160 volts, peak to peak, the modulation approached a horizontal asymptote. As higher voltages were applied most of the energy was coupled into heating the crystal. At 160 volts the crystal was found to be oscillating $1.6 \times 10^{-7}$ m or 93% of a half FSR. At 11.5 MHz the crystal laser modulation was not as pronounced and at 49.8 MHz the modulation effect was not observed. Sinusoidal, square and triangular waves all provide adequate driving sources.

The half field of view of the modulator 10 was measured by rotating the crystal between a fixed laser beam and a detector. As the crystal was rotated the magnitude of the laser modulation varied as the laser wavelength was modulated by different regions of the Airy curve. The maximum transmission points were found to be separated by one degree. The maximum modulation was found to be relatively constant up to 60°. At approximately 60° the modulation rapidly dropped. The effective full field of view for the Fabry-Perot modulator is thus approximately 120°.

The modulation uniformity across the face of the crystalline body 12 was measured using a laser beam of small cross sectional area. The probe beam was used to determine the average modulation in nine regions of the crystal. The crystal modulation was found to be quite uniform although some damping is observed where the electrodes 14 are attached to the body 12. In that modulation is uniform optical gain may be used to increase the sensitivity or quadrant detectors may be employed to determine direction of arrival information.

A major noise source of a visible LR is shot noise produced by direct and indirect radiation from the sun. This noise is reduced by the modulator 10 of the invention in that the crystal reflects more than half of the incident incoherent light, while laser light is either highly transmitted or reflected at different times during modulation. A still greater noise reduction is accomplished by utilizing the phase information of the signal. The laser modulation is either in phase or 180° out of phase with the crystal modulation voltage.

Enhanced detection sensitivity was achieved with the lock-in detection technique of FIG. 3a utilizing the chopper 22. For this technique the chopper 22 first chops the laser irradiance. The detector signal was filtered, at the resonance frequency of 3.75 MHz, and the resulting signal was rectified. The resulting on-off signal was multiplied by the chopper reference signal and integrated. Using this technique an irradiance of $5 \times 10^{-8}$ w/cm$^2$ was detected with the lock-in amplifier 30 set at a 0.1 second integration time. Similar sensitivity is believed to be achievable utilizing the phase information of the crystal resonator itself and eliminating the chopper 22, as depicted in FIG. 3b.

Background noise rejection using the lock-in approach was measured by collimating the radiation from an Eppley tungsten lamp through a pinhole. For this collimated white source no laser flag signal was generated by the threshold detector 32. However, a laser source 1000 times weaker generated a clear laser detection signal. In addition, a broadband strobe light was flashed against the detection system of the invention. The strobe light was 10,000 times brighter than the laser threshold. The strobe light was found to not generate a false laser detection signal nor to prevent laser detection.

Furthermore, the thickness of the crystalline body 12 can be fabricated to ensure that a multi-line laser source is detected. For example, the crystal thickness is selected such that two major Argon lines are modulated in phase. Analysis has shown that using this technique a multi-line argon-ion laser is modulated at least 90% as effectively as is a single line laser.

In conclusion, an embodiment of an acousto-optic Fabry-Perot optical modulator constructed and operated in accordance with the invention has a field of view of approximately 120°, a sensitivity of greater than approximately $5 \times 10^{-7}$ w/cm$^2$ with a one millisecond laser pulse having a wavelength of 0.6328 microns and a background rejection ratio of approximately 10,000:1. The spectral range is approximately 0.35 microns to approximately 5.0 microns, which is the transmission of $LiNbO_3$. The crystalline body may have a thickness within a range of approximately 0.2 mm to approximately 3.0 mm.

The principles of the acousto-optic Fabry-Perot modulator apply to etalons of any shape including square (cubic), triangular, etc. The vibration waves produced at resonance are not coupled in any manner to the lateral dimensions of the device, therefore any geometrical face shape is appropriate.

While the invention has been particularly shown and described with respect to a preferred embodiment thereof, it will be understood by those skilled in the art that changes in form and details may be made therein without departing from the scope and spirit of the invention.

What is claimed is:

1. An optical modulator for selectively varying the intensity of a coherent light beam while having minimal effect on noncoherent light beams comprising:
   an interferometer including;
      a body of piezoelectric crystalline material substantially transparent to the wavelength of said light beams, and bounded by spaced parallel faces having a spacing of less than about one-forth coherence length of said coherent light beam to be modulated in the material of said body,
      said body being constructed of a material exhibiting a piezoelectric resonance when excited by an time varying electric field of predetermined frequency established between said faces;
      first and second conductive electrodes formed in contact with each said face respectively for forming a pair of conductive electrodes,
      each of said electrodes being internally reflective for said light beams to form an acousto-optic Fabry-Perot interferometer,
      at least one of said electrodes being semitransparent for admission of said light beams into the body of said interferometer and for allowing modulated light to exit after interference so that a coherent light beam admitted into said interferometer undergoes constructive and destructive interference therein;
   means for generating an electrical signal at said predetermined frequency of said body and for connecting said signal to said electrodes for causing piezoelectric expansion and contraction of said body and a corresponding change in separation of said reflective electrodes,
   said electric signal causing an electrical field which expands and contracts said body and electrode reflectors between greater values and lesser values of interference so as to modulate the intensity of said exiting beam with said resonance frequency.

2. An optical modulator as set forth in claim 1 wherein the body is comprised of z-cut $LiNbO_3$, y-cut quartz, or z-cut $LiTaO_3$.

3. An optical modulator as set forth in claim 2 wherein the body has a thickness within a range of approximately 0.2 mm to approximately 3.0 mm.

4. An optical modulator as set forth in claim 1 and further comprising a binding layer interposed between each of the electrodes and the underlying surface of the body.

5. An optical modulator as set forth in claim 1 wherein the body has a plurality of resonant frequencies one of which is approximately 3.75 MHz.

6. Apparatus for detecting the presence of coherent radiation within a field of view of the apparatus, comprising:
   an interferometer including;
      a body of piezoelectric crystalline material substantially transparent to the wavelength of said light beams, and bounded by spaced parallel faces having a spacing of less than about one-forth coherence length of said coherent light beam to be modulated in the material of said body,
      said body being constructed of a material exhibiting a piezoelectric resonance when excited by an time varying electric field of predetermined frequency established between said faces;
      first and second conductive electrodes formed in contact with each said face respectively for forming a pair of conductive electrodes,
      each of said electrodes being internally reflective for said light beams to form an acousto-optic Fabry-Perot interferometer,
      at least one of said electrodes being semitransparent for admission of said light beams into the body of said interferometer and for allowing modulated light to exit after interference so that a coherent light beam admitted into said interferometer undergoes constructive and destructive interference therein;
   means for generating an electrical signal at said predetermined frequency of said body and for connecting said signal to said electrodes for causing piezoelectric expansion and contraction of said body and a corresponding change in separation of said reflective electrodes,
   said electric signal causing an electrical field which expands and contracts said body and electrode reflectors between greater values and lesser values of interference so as to modulate the intensity of said exiting beam with said resonance frequency;
   detector means positioned for receiving the emitted radiation including the intensity modulated coherent radiation, the detector means having an output signal expressive of the intensity of the emitted coherent radiation; and
   processing means coupled to the detector means output signal and responsive thereto for indicating when a modulator radiation is received by the detector means.

7. Apparatus as set forth in claim 1 wherein said body is comprised of a crystalline material that is substantially transparent to radiation having the wavelength or wavelengths of interest, having said first electrode and said second electrode coupled thereto on the first and on the second surfaces, respectively, of the body for electrically coupling the body to a source of excitation energy, the first electrode and the second electrode each being partially transparent and partially reflecting to radiation having the wavelength or wavelengths of interest, the body being responsive to an alternating electrical potential applied to the first and the second electrodes at a resonance frequency of the body for varying an optical path length through the body in synchronism with the alternating electrical potential such that the coherent radiation having the wavelength or wavelengths of interest is multiply reflected therein between the first and the second electrodes, the coherent radiation experiencing alternating constructive and destructive interference for intensity modulating the coherent radiation.

8. Apparatus as set forth in claim 7 wherein the body is comprised of z-cut $LiNbO_3$, y-cut quartz, or z-cut $LiTaO_3$.

9. Apparatus as set forth in claim 8 wherein the body has a thickness within a range of approximately 0.2 mm to approximately 3.0 mm.

10. Apparatus as set forth in claim 7 wherein the first and the second electrodes are comprised of an electrically conductive metal, an electrically conductive dielectric, or combinations thereof.

11. Apparatus as set forth in claim 7 and further comprising a binding layer interposed between each of the electrodes and the underlying surface of the body.

12. Apparatus as set forth in claim 7 wherein the body has a plurality of resonant frequencies one of which is approximately 3.75 MHz.

13. Apparatus as set forth in claim 7 wherein the source of excitation energy generates an excitation waveform having an amplitude of less than approximately ±200 volts.

14. Apparatus as set forth in claim 12 wherein the source of excitation energy generates an excitation waveform having a frequency of approximately 3.75 MHz.

15. Apparatus as set forth in claim 6 and further comprising optical chopper means interposed between the second surface of the modulator means and the detector means.

* * * * *